United States Patent [19]

Cornfield

[11] Patent Number: 5,520,003
[45] Date of Patent: May 28, 1996

[54] LEAK CONTAINER AND METHOD

[76] Inventor: Lloyd Cornfield, 21 Lauderdale Road, Brampton, Ontario, Canada, L6V 2B6

[21] Appl. No.: 352,192

[22] Filed: Dec. 1, 1994

[51] Int. Cl.⁶ .................................................. G01M 3/00
[52] U.S. Cl. ........................... 62/56; 62/129; 73/40; 73/863.86; 150/154
[58] Field of Search ................ 62/125, 129, 506, 62/507, 56; 73/40, 863.86, 863.81, 863.83, 863.85; 150/154

[56] References Cited

U.S. PATENT DOCUMENTS

| | | |
|---|---|---|
| 373,741 | 11/1887 | Johnson . |
| 3,148,699 | 9/1964 | Shindler . |
| 3,803,900 | 4/1974 | Maillard . |
| 4,202,389 | 5/1980 | Ewald . |
| 4,341,237 | 7/1982 | Stauffer . |
| 4,603,432 | 7/1986 | Marino . |
| 4,745,769 | 5/1988 | Wooden, Jr. ................ 150/154 X |
| 4,890,638 | 1/1990 | Davenport . |
| 4,947,794 | 8/1990 | Baldwin ......................... 150/154 X |
| 4,993,457 | 2/1991 | Berfield . |
| 5,097,678 | 3/1992 | Aubuchon . |
| 5,247,802 | 9/1993 | Maniez et al. . |

*Primary Examiner*—William E. Tapolcai
*Attorney, Agent, or Firm*—Bereskin & Parr

[57] ABSTRACT

A leak container is provided for detecting whether a refrigerant is leaking from an outdoor condenser of a split system air conditioner. The container includes a substantially gas impervious enclosure having top and side walls for fitting over the condenser. A sealing strip is located on the bottom edge of the walls so that a substantially gas impervious seal can be formed about the condenser. An enclosed space is defined between the condenser and the enclosure. The enclosed space is adapted to contain a refrigerant leaking from the condenser. A plurality of valves are located in corresponding apertures defined in the walls. The valves permit air samples to be taken from the enclosed space. A method for detecting leaks is provided comprising the steps of covering the condenser with the enclosure, sealing the enclosure, collecting air samples through the valves, and testing the air samples for traces of refrigerant.

13 Claims, 2 Drawing Sheets

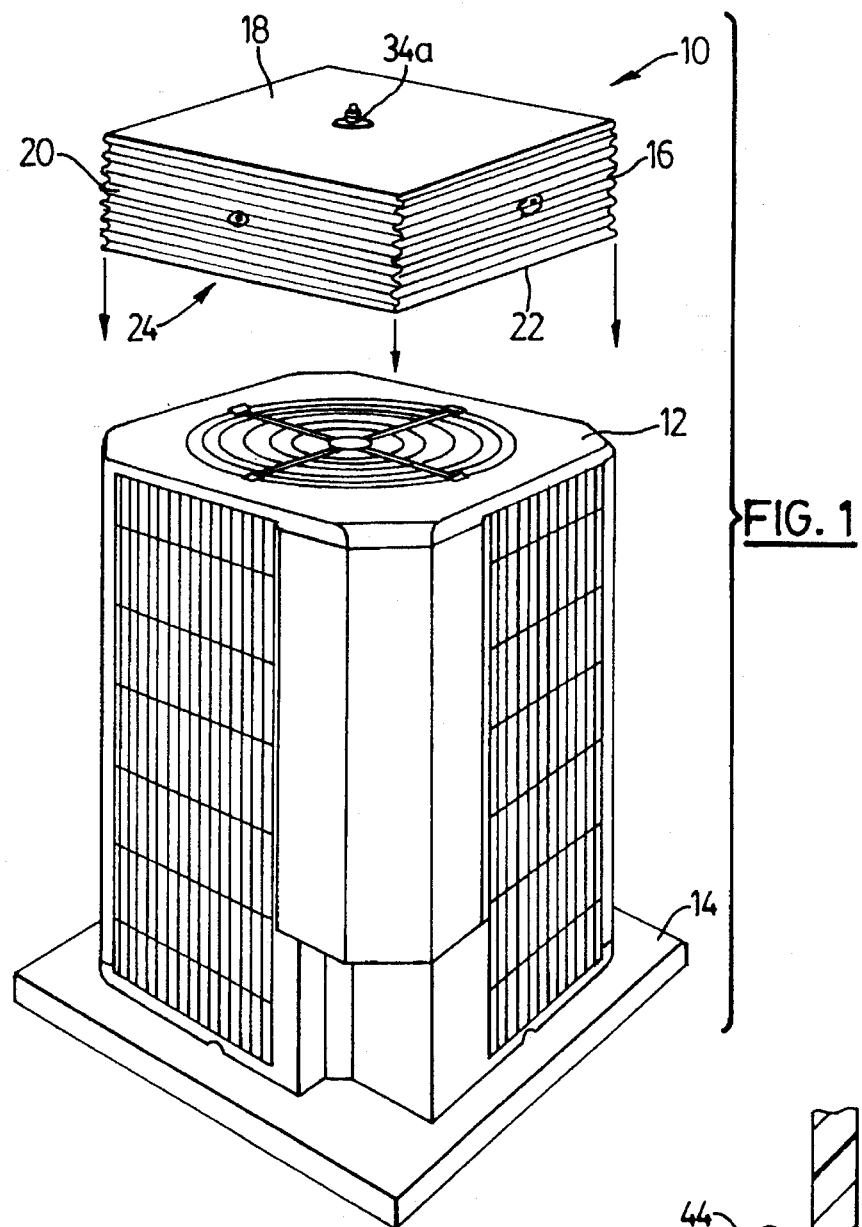
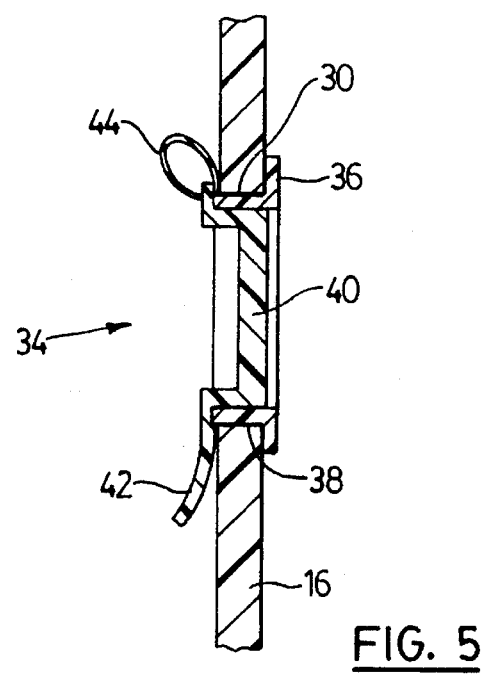
FIG. 1
FIG. 5

LEAK CONTAINER AND METHOD

FIELD OF THE INVENTION

The present invention relates to air conditioners, and in particular to a container for use in detecting and containing refrigerant leaks from the condenser of a split system air conditioner.

BACKGROUND OF THE INVENTION

There is a growing concern nowadays about the harmful effects of refrigerants that can leak into the atmosphere from refrigeration systems such as air conditioners. It has been found that harm is being caused to the ozone layer by leaking refrigerants such as Refrigerant 12 (dichlorodifluoromethane). Due to such concerns, many jurisdictions have enacted by-laws requiring persons who service refrigeration systems to shut down a system if a leak is suspected. The by-laws typically require that the system cannot be reactivated until the leak is discovered and repaired.

The detection of a leak in split system air conditioners can be particularly difficult. This is because the condenser for such air conditioners is located outdoors where a leaking refrigerant tends to become quickly dissipated into the atmosphere. Conventional leak detectors (eg. electronic or Halide detectors) that collect and analyze air samples from the air surrounding the air conditioner are of little use outdoors since the refrigerant tends to be dissipated before a sufficient amount of leaked refrigerant can be collected for analysis in an air sample. As a result, more time consuming methods for detecting leaks in such air conditioners must be used. For instance, sections of the condenser pipes could be covered with a soap film and searched for subsequent bubbles indicating leaks. When a lengthy network of condenser pipes must be checked, such traditional methods can be quite time consuming. Furthermore, the leak may end up not being located at the condenser at all, but instead at another portion of the refrigerant circuit (e.g. the evaporator located indoors). As a consequence, a lot of time can be wasted by a service person searching in the wrong area of the air conditioning system.

What is needed is a means for a service person to quickly narrow down whether a refrigerant is leaking from an outdoor condenser of a split system air conditioner.

SUMMARY OF THE INVENTION

In one aspect, the invention is directed to a leak container comprising:
(a) a substantially gas impervious enclosure for enclosing a condenser for a split system air conditioner, said enclosure defining an enclosed space between said condenser and said enclosure for containing a refrigerant leaking from said condenser;
(b) at least one aperture defined in said enclosure for permitting access to said enclosed space from outside of said enclosure; and
(c) a valve located in said aperture, said valve releasably closing said aperture to permit an air sample to be collected from said enclosed space for subsequent testing for traces of said refrigerant.

In another aspect, the invention is directed to a method for detecting and containing refrigerant leaks comprising the steps of:

(a) positioning a substantially gas impervious enclosure over a condenser, said enclosure defining an enclosed space between said condenser and said enclosure for containing a refrigerant leaking from said condenser;
(b) collecting an air sample from said enclosed space; and
(c) testing said air sample for traces of refrigerant.

Advantageously, the container can be temporarily installed over an operating condenser (i.e. a condenser that is in current use, the condenser being temporarily shut off for testing) to establish a sealed enclosed space for detection and containment of leaking refrigerant. The valve facilitates the collection of air samples from the sealed enclosed space for subsequent testing. The container can be permanently installed over a non-operating condenser (i.e. a condenser that is not in current use e.g. shut off for the winter season) to protect the condenser from dirt and the like during the period of non-operation. In either case, the container acts to prevent refrigerant from leaking from the condenser into the atmosphere. The contained refrigerant can be reclaimed through the valve for subsequent disposal/recycling in an environmentally safe manner.

BRIEF DESCRIPTION OF THE DRAWINGS

For a better understanding of the present invention, and to show more clearly how it may be carried into effect, reference will now be made, by way of example, to the accompanying drawings. The drawings show a preferred embodiment of the present invention, in which:

FIG. 1 is an exploded perspective view of a leak container in accordance with the present invention being fitted over a condenser of a split system air conditioner;

FIG. 5 is a sectional view of a valve for the leak container of FIG. 2, taken along line 5—5.

DETAILED DESCRIPTION OF THE PREFERRED EMBODIMENT

Figure 2:
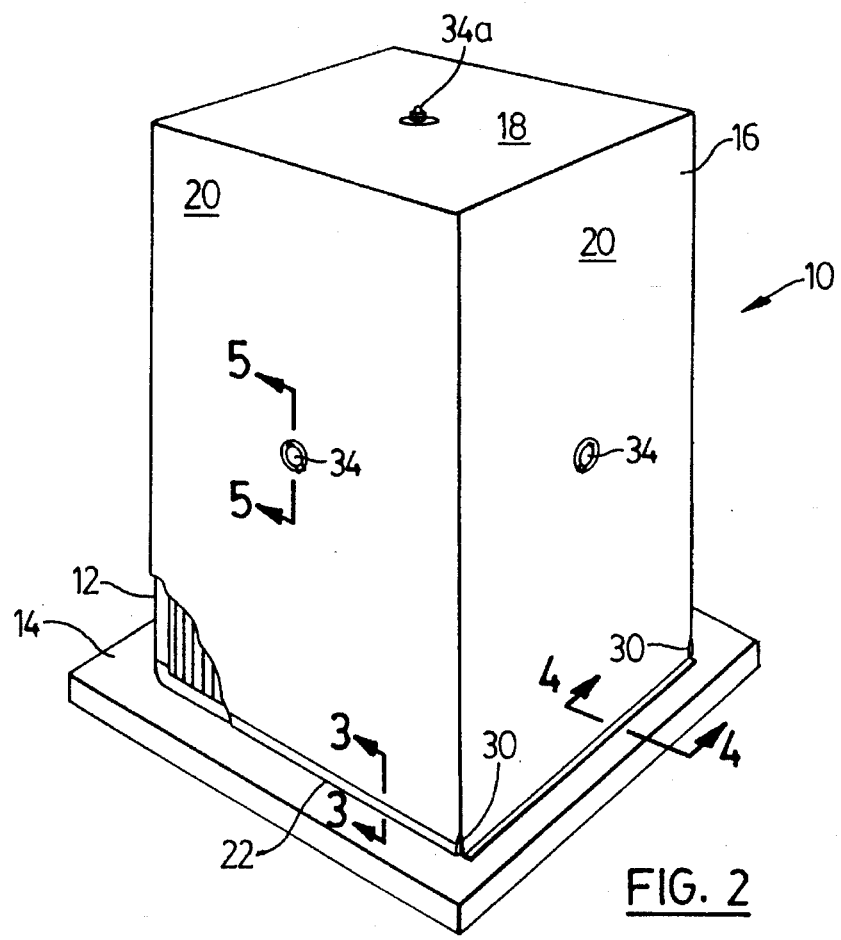
FIG. 2 is a perspective partially broken away view of the leak container of FIG. 1 shown covering the condenser.

A leak container in accordance with the present invention is shown generally at 10 in FIGS. 1 and 2. The container 10 is adapted to fit over a condenser 12 of a split system air conditioner. The condenser 12 is located outdoors and is typically seated on a support surface 14 such as a concrete pad.

The leak container 10 includes an enclosure 16 having a top wall 18, side walls 20 and a bottom edge 22. The bottom edge 22 defines an opening 24 for receiving and covering the condenser 12. The enclosure 16 is sized and shaped to fit closely over the condenser 12. A small enclosed space 26 is defined between the outer surface of the condenser 12 and the inner surface of the walls 18,20 of the enclosure 16. The enclosed space 26 is adapted to contain refrigerant that may be leaking from the condenser 12. The enclosed space 26 is preferably of a relatively small volume so that the ratio of leaked refrigerant to air can be optimized for quick detection.

The enclosure 16 is preferably constructed from a durable flexible material (it has been found that Polyvinyl chloride (PVC) material having a thickness of 28 mm is suitable) so that it may be collapsed or folded for storage and transport. It is important that the material be substantially gas impervious so that refrigerant leaking from an enclosed condenser will be contained within the enclosed space 26 and will not leak through the walls 18,20 to the atmosphere. Also, it is preferred that the material be durable so that the container 10 is resistant to puncturing and so that it may be left in place over the condenser 12 to protect the condenser 12 from dirt, leaves etc. during periods when the air conditioner is not in use.

The enclosure 16 shown in FIGS. 1 and 2 is sized and shaped to fit over a condenser 12 having substantially rectangular sides. It will be understood by those skilled in the art however that condensers 12 for split system air conditioners are available in a variety of sizes and shapes (eg. cylindrical) and that enclosures 16 of corresponding size and shape may be constructed as required.

Figure 3:
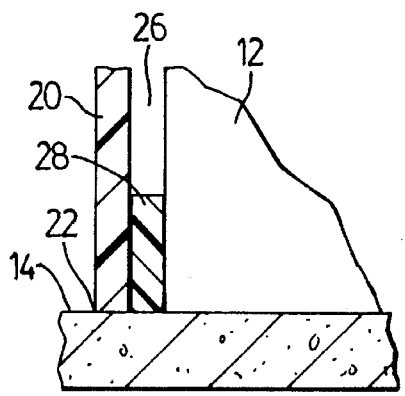
FIG. 3 is a sectional view of a first orientation for a sealing strip for the leak container of FIG. 2, taken along lines 3—3.
Figure 4:
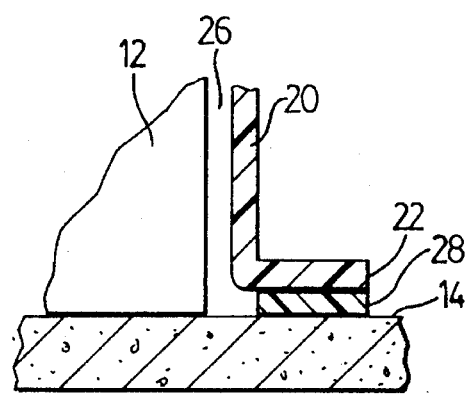
FIG. 4 is a sectional view of a second orientation of the sealing strip for the leak container of FIG. 2, taken along lines 4—4.

A sealing strip 28 is located on the enclosure 16 for sealing the bottom edge 22 of the enclosure 16 to the condenser 12 or to the concrete pad 14. The sealing strip 28 is located along the inside surface of the side walls 20 adjacent to the bottom edge 22. The sealing strip 28 comprises two sided tape (as shown in FIGS. 3 and 4), a magnet, a weighted edge strip, an elasticized bottom edge 22 or any other suitable means for establishing a substantially gas impervious seal about the condenser 12. The sealing strip 28 is placed into sealing contact with either the outer wall of the condenser 12 as shown in FIG. 3, or with the surface of the concrete pad 14 as shown in FIG. 4. The corners of the side walls 20 of the enclosure 16 include slits 30 so that the bottom edge 22 and sealing strip 28 can be folded flat into contact with the concrete pad 14.

The walls 18,20 of the enclosure 16 define apertures 32 for receiving corresponding valves 34. As shown in detail in FIG. 5, the preferred valves 34 include a ring 36 that engages a peripheral edge 38 of the aperture 32. A plug 40 fits snugly within the ring 36 to form a substantially gas impervious seal. A finger tab 42 is located on the plug 40 to assist in removing the plug 40 from the ring 36 so an air sample may be taken from the enclosed space 26. A hinge 44 connects the tab 42 to the ring 36.

The above described valves 34 are currently commercially available at a relatively low price and are considered to perform adequately. A small amount of refrigerant may be leaked into the atmosphere when each valve 34 is opened for taking air samples. It has been found however that the amount leaked is small enough so as not to be a concern. Nevertheless, the valves 34 could instead comprise more sophisticated valves that permit air samples to be taken without leaking refrigerant into the atmosphere. An example of such a valve is a Shrader (trademark) valve as shown at 34a in the top wall 18 of the enclosure 16. It is preferred to include at last one such valve 34a in the enclosure 16 so that a conventional reclamation device (not shown) may be attached for removing the collected refrigerant from the enclosed space 26. Such a device permits the refrigerant to be disposed or recycled in an environmentally friendly way.

The valves 34 are preferably located in each wall of the container 10 to permit air samples to be taken at different locations about the condenser 12. This enables the location of any leaks to be further narrowed down to the particular side of the condenser 12 showing the highest concentration of refrigerant.

The leak container 10 could be used either by a professional who services air conditioners or by a residence or business occupant who utilizes the air conditioner. The professional would use the container 10 to temporarily cover an operating condenser 12 (i.e. a condenser in current use) to detect if refrigerant is leaking and to contain the leak. The residence or business occupant would use the container 10 to protect a non-operating condenser 12 (i.e. a condenser not in current use) from dirt and the elements during the period of non-operation (eg. over the winter months).

When the container 10 is used by a professional for leak detection of an operating condenser 12, the condenser 12 is first shut off. This is recommended since the fan of the condenser could become damaged if the entire condenser 12 is enclosed by the enclosure 16. The enclosure 16 is then fitted over the condenser 12 and the bottom edge 22 of the enclosure 16 is sealed about the condenser 12 with the sealing strip 28. As a result, a sealed enclosed space 26 is established for containing any leaking refrigerant. After a sufficient waiting period for any leaking refrigerant to collect in the enclosed space 26 (between 5 and 30 minutes has been found to be sufficient), air samples are collected through the valves 34. The air samples are tested using conventional testing devices to identify the concentration of refrigerant (if any) in each air sample. Such testing devices include electronic or Halide leak detectors (not shown). The concentrations of refrigerant from the air samples taken from the different sides of the condenser 12 are compared to determine if one side of the condenser 12 has a higher refrigerant concentration than another side. The leak is then narrowed down to the particular side of the condenser 12 having the highest concentration of refrigerant.

If refrigerant is found to be leaking from the condenser 12, the refrigerant flow to the condenser 12 is shut off to prevent further leaking. The refrigerant in the system is then reclaimed with a conventional reclamation device (not shown). Similarly, the refrigerant contained in the enclosed space 26 is reclaimed through the Shrader valve 34a. The container 10 is then removed so that repairs to the condenser 12 can be made.

When the container 10 is used by a home or business occupant to protect the condenser 12 during non-operational periods, the enclosure 16 is fitted over the non-operational condenser 12 and the bottom edge 22 of the enclosure 16 is sealed about the condenser 12 with the sealing strip 28. A secondary seal may be provided about the bottom edge 22 (for instance with duct tape) to secure the enclosure 16 from being blown off the condenser 12 by the wind.

Once in place, the container 10 acts to prevent dirt, leaves and other matter from entering the workings of the condenser 12 over the non-operational period. Also, the enclosed space 26 of the container 10 contains any refrigerants that might otherwise leak from the condenser 12 over the non-operational period. When the time comes for bringing the air conditioner back into operation, it is preferred that a service person collect air samples from the enclosed space 28 to determine if any refrigerant has leaked. If a leak is discovered, the contained refrigerant can be reclaimed through the Shrader valve 34a for subsequent disposal/recycling. The container 10 can then be removed and the condenser 12 can be readied for operation (or repaired if a leak is discovered).

It is to be understood that what has been described are preferred embodiments of the invention. The invention nonetheless is susceptible to certain changes and alternative embodiments fully comprehended by the spirit of the invention as described above, and the scope of the claims as set out below.

I claim:

1. A leak container comprising:
   (a) a substantially gas impervious enclosure for enclosing a condenser for a split system air conditioner, said enclosure defining an enclosed space between said condenser and said enclosure for containing a refrigerant leaking from said condenser;
   (b) at least one aperture defined in said enclosure for permitting access to said enclosed space from outside of said enclosure; and
   (c) a valve located in said aperture, said valve releasably closing said aperture to permit an air sample to be collected from said enclosed space for subsequent testing for traces of said refrigerant.

2. A leak container as claimed in claim 1, further comprising means for releasably sealing said enclosure about said condenser to establish a substantially gas impervious seal.

3. A leak container as claimed in claim 1, wherein said enclosure is substantially flexible to permit collapsing for storage or transport.

4. A leak container as claimed in claim 1, wherein a plurality of said valves are arranged about said enclosure to permit air samples to be taken from different locations about the condenser.

5. A leak container as claimed in claim 1, wherein said valve includes a removable plug that sealingly fits within a corresponding ring, said ring being sealingly fitted within said aperture defined in said enclosure.

6. A leak container as claimed in claim 1, wherein said valve comprises a Shrader valve for facilitating air sampling from said enclosed space without leakage of refrigerant.

7. A leak container as claimed in claim 1, wherein said enclosure is sufficiently durable to withstand inclement weather conditions when said container is used to protect said condenser from accumulations of dirt during a non-operational period.

8. A leak container as claimed in claim 2, wherein said sealing means comprises a sealing strip located adjacent to a bottom edge of said enclosure, said sealing strip being adapted to sealing connect said enclosure to said condenser or to a surface supporting said condenser.

9. A method for detecting refrigerant leaks from a condenser of a split system air conditioner, comprising the steps of:
   (a) positioning a substantially gas impervious enclosure over the condenser, said enclosure defining an enclosed space between said condenser and said enclosure for containing a refrigerant leaking from said condenser;
   (b) collecting an air sample from said enclosed space; and
   (c) testing said air sample for traces of refrigerant.

10. A method as claimed in claim 9, wherein said condenser has been shut off prior to positioning of said enclosure over said condenser.

11. A method as claimed in claim 10, wherein said air sample is collected through a valve located in an aperture defined in said enclosure.

12. A method as claimed in claim 10, further comprising the step of releasably sealing said enclosure about said condenser to establish a substantially gas impervious seal.

13. A method as claimed in claim 11, wherein a plurality of said valves are arranged about said enclosure, and wherein an air sample is collected through each said valve and the test results for each air sample are compared to determine if a greater concentration of refrigerant is collecting at one location of said condenser.

* * * * *